Patented June 24, 1930

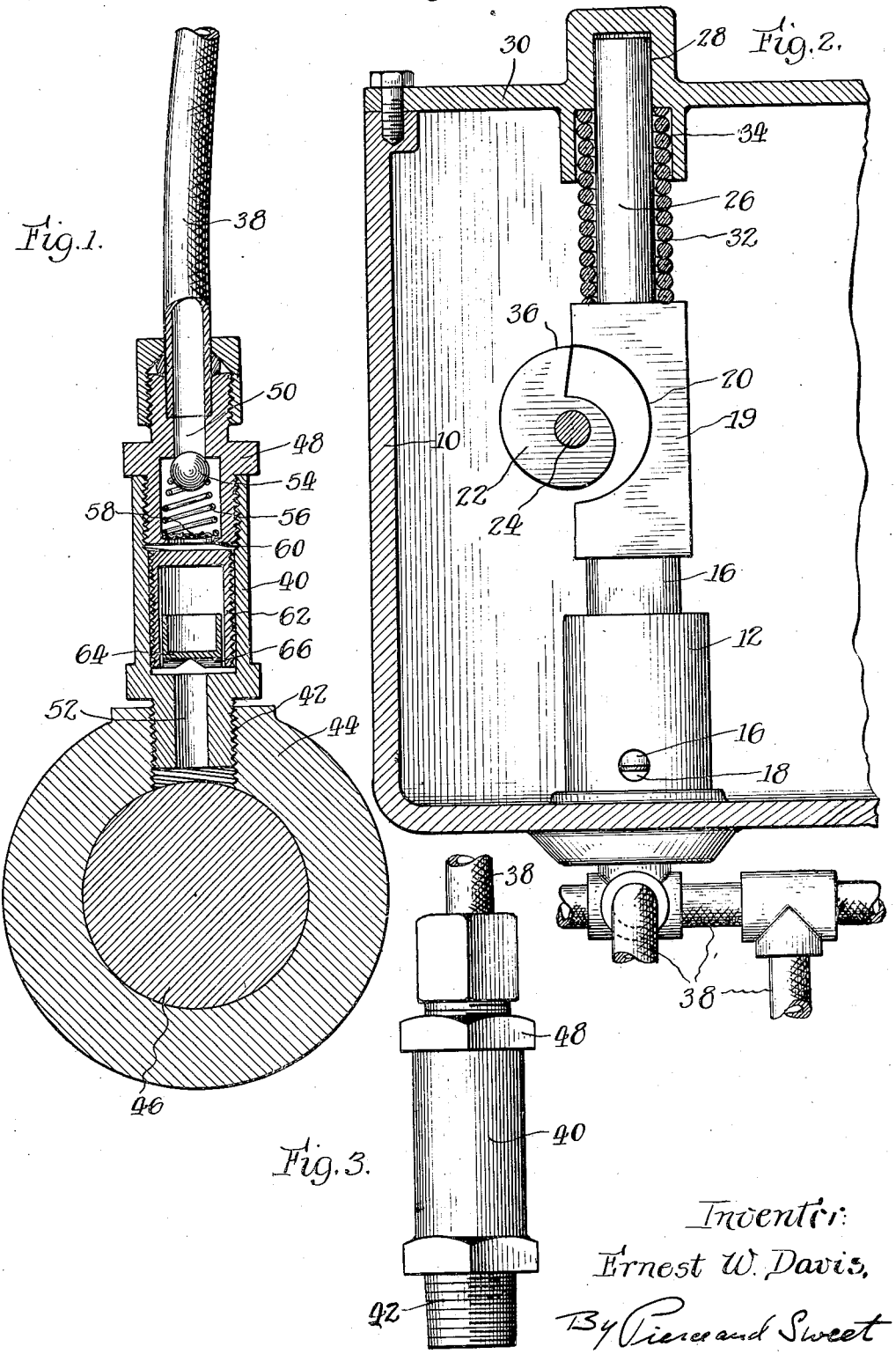

1,767,515

UNITED STATES PATENT OFFICE

ERNEST W. DAVIS, OF OAK PARK, ILLINOIS, ASSIGNOR TO ALEMITE CORPORATION, OF CHICAGO, ILLINOIS, A CORPORATION OF DELAWARE

LUBRICATING SYSTEM

Application filed August 1, 1925. Serial No. 47,528.

My invention relates to lubrication and more specificially to an improved lubricating system of the general type known as centralized.

Among the objects and advantages of the invention may be enumerated:

First, the provision of a centralized system in which a single source of lubricant under pressure is connected with the bearings by one or more conduits that may be branched, or divided, to supply lubricant to a plurality of bearings, so that it is not necessary to provide a conduit leading from the pump to each of the bearings.

Second, the provision of a lubricating system such as described, in which the source of lubricant under pressure may or may not include means for more or less accurately measuring the lubricant applied to the bearings during each operation of the system.

Third, the provision of a system, such as described, including means at each of the bearings for determining the relative apportionment between the different bearings.

Fourth, the provision of means in a system according to the third object for rendering the apportionment between different bearings substantially independent of the flow resistance properties of the different bearings, and Fifth, automatic compensation for differences in the resistance of the different bearings to entry of the lubricant, and more or less continuous maintenance during the intervals between successive lubrications of pressure on each bearing sufficient to compel the bearing to receive its predetermined quota, all independent and without disturbance to the apportioning means.

Further objects and advantages of the invention will become apparent as the description proceeds.

In the accompanying drawings:

Figure 1 is a central axial section through an apportioning unit according to the invention.

Figure 2 is a sectional view of a lubricant pumping means of a type that may advantageously be combined with the unit of Figure 1.

Figure 3 is a side elevation of the unit of Figure 1.

In the embodiment of the invention selected for illustration, the lubricant source comprises a reservoir 10 having a compression cylinder 12 mounted on its bottom. The compression cylinder receives the plunger 16 which, at the top of its stroke, clears the inlet port 18 to admit a charge of lubricant to the cylinder. The plunger 16 is continued in an enlargement 19 having a lateral pocket 20 to receive a cam 22 mounted on a shaft 24. An extension 26 above the enlargement 19 enters a guiding pocket 28 in the reservoir cover 30. The plunger 16 and associated parts are strongly urged downward by a compression spring 32 abutting the enlargement 19 and seating in a pocket 34 formed on the cover. It will be apparent that each time the shaft 24 carries the toe 36 of the cam 22 out of the pocket 20, the plunger 16 will move downward to trap a charge of lubricant in the bottom of the cylinder and maintain a high pressure thereon until it has been expelled through the system of conduits 38 leading to the various bearings.

At the end of each conduit 38 I provide an apportioning unit. I have illustrated a body 40 threaded at 42 into the stationary bearing member 44 which receives the movable member 46. The body 40 cooperates with a cap 48 to define a housing having an inlet 50 and an open outlet 52 leading to the bearing. A check valve 54 held in place by a spring 56, which also retains a screen 58 against displacement by pressing it against a flange 60 at the lower edge of the cap 48, normally closes the inlet 50. The cup shaped member 62 has a threaded exterior and is a pressed fit in the smooth and unthreaded portion of the body 40 receiving the same. Lubricant passing through the unit is thus constrained to follow the spiral course of the threads through a path of considerable length and relatively high flow resistance. The space inside the cup 62 is normally filled with air and operates as a resilient storage chamber. When the unit is to operate upside down or in a position other than the upright one of Figure 1, I preferably provide a retainer 64 in the form of a cup telescoping in cup 62. To make use of the entire volume afforded by the cup 62, the cup 64 is preferably inverted. V-shaped grooves 66 may be formed in the bottom of the cup 64 to prevent it from fitting over the end of the outlet 52 and interrupting the discharge of lubricant.

It will be apparent that the relative rates of oil supply to different bearings having different requirements may be readily obtained by the use of calibrated cups 62 having threads formed to make passages of different lengths and cross sections. I have found that a complete system can readily be built so that the lowest flow resistance has a value considerably in excess of the highest resistance offered by any bearing. However, where resilient storage means is interpolated between the check valve and the bearing, any marked superiority in the resistance of the calibrated cups as compared with the resistance of the bearing, becomes largely unnecessary because the storage unit will receive the lubricant at the time of lubrication, and build up a pressure proportionate to the bearing resistance, maintaining this pressure until the bearing has withdrawn its predetermined quota. The combination of a plurality of units according to Figure 1 with a lubricant supply means of the type indicated in Figure 2, i. e. one which, at each lubrication period, tends to deliver a total charge substantially fixed in quantity, renders any other measuring means aside from the pump itself unnecessary. Thus, the pump will measure and deliver the total amount of lubricant that should be received by all the bearings associated with it, the different calibrated flow resistances will sub-divide this total charge accurately as between the different bearings, and the storage chambers will retain the smaller sub-divided charges and press them into the bearings with as much pressure as may be necessary to get them in.

Without further elaboration, the foregoing will so fully explain the gist of my invention, that others may, by applying current knowledge, readily adapt the same for use under various conditions of service without eliminating certain features which may properly be said to constitute the essential items of novelty involved, which items are intended to be defined and secured to me by the following claims.

I claim:

1. A lubricating system comprising means acting periodically to deliver measured charges of lubricant, check valved means receiving said charges, a calibrated flow resistance receiving said charges from said last named means, a resilient storage chamber receiving said charges from said calibrated flow resistance and a bearing to be lubricated communicating with said chamber.

2. A lubricating system comprising means acting periodically to deliver lubricant under pressure, check valved means receiving said charges, a resilient storage chamber, a calibrated flow resistance forming the only path of communication between said check valved means and said chamber, and a bearing to be lubricated communicating with said chamber.

3. A lubricating system comprising means acting periodically to deliver measured charges of lubricant, a branched conduit receiving said charges, each branch containing check valve means, a calibrated flow resistance in each branch beyond said check valve means, a bearing to be lubricated in each branch beyond said flow resistance, and resilient storage means in each branch between said flow resistance and said bearing for rendering the calibration largely independent of bearing resistance.

4. A lubricating system comprising means for delivering lubricant under pressure, a branched conduit receiving said charges, a calibrated flow resistance in each branch, a bearing to be lubricated in each branch beyond said flow resistance, and resilient storage means in each branch between said flow resistance and said bearing for rendering the calibration largely independent of bearing resistance.

5. A flow resistance unit for lubricating systems comprising a hollow cylinder having a relatively smooth inner surface, a filler fast in said cylinder, said filler having its outer surface threaded to form a passage for lubricant, said filler being cup shaped, a piston freely slidable in said filler, and a filling of gas in said cup.

6. A lubricating system comprising a plurality of bearings to be lubricated, a source of lubricant, a branched conduit connecting said source of lubricant with said bearings, a calibrated flow resistance in each branch of said conduit for maintaining a proportionality between the quantities of lubricant supplied to each bearing and means between each flow resistance and each bearing for storage under variable pressure the oil discharged past said flow resistance.

7. A lubricating system comprising a plurality of bearings to be lubricated, a source of lubricant, a branched conduit connecting said source of lubricant with said bearings, a calibrated flow resistance in each branch of said conduit for maintaining a proportionality between the quantities of lubricant supplied to each bearing, and means between each flow resistance and each bearing for storing under resilient pressure the oil discharged past said flow resistance.

8. A control unit for lubricant supply systems comprising a housing having an inlet and an open outlet, a check valve, a flow resistance, and a resilient storage means, said storage means being between said flow resistance and said outlet.

9. A control unit for lubricant supply systems comprising a housing having an inlet and an outlet, a check valve, a flow resistance, and a resilient storage means, said last two elements being both inside said housing, and said storage means being between said flow resistance and said outlet.

In witness whereof, I hereunto subscribe my name this 14th day of July, 1925.

ERNEST W. DAVIS.